(12) United States Patent
Trimeche et al.

(10) Patent No.: US 7,394,930 B2
(45) Date of Patent: Jul. 1, 2008

(54) AUTOMATIC WHITE BALANCING OF COLOUR GAIN VALUES

(75) Inventors: Mejdi Trimeche, Tampere (FI); Markku Vehviläinen, Tampere (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 11/031,493

(22) Filed: Jan. 7, 2005

(65) Prior Publication Data

US 2006/0153444 A1 Jul. 13, 2006

(51) Int. Cl.
*G06K 9/00* (2006.01)
*H04N 9/73* (2006.01)

(52) U.S. Cl. .................. 382/167; 382/168; 348/223.1; 348/655

(58) Field of Classification Search ......... 382/167–169; 348/223.1, 225.1, 655; 358/515, 520
See application file for complete search history.

(56) References Cited

U.S. PATENT DOCUMENTS

| | | | |
|---|---|---|---|
| 5,223,921 A * | 6/1993 | Haruki et al. | 348/655 |
| 5,619,347 A * | 4/1997 | Taniguchi et al. | 358/516 |
| 6,069,972 A | 5/2000 | Durg et al. | 382/167 |
| 6,707,491 B1 * | 3/2004 | Choi | 348/223.1 |
| 6,791,606 B1 * | 9/2004 | Miyano | 348/223.1 |
| 6,940,556 B1 * | 9/2005 | Tamune | 348/350 |
| 7,030,913 B2 * | 4/2006 | Ikeda | 348/223.1 |
| 7,126,644 B2 * | 10/2006 | Xia et al. | 348/655 |
| 7,283,667 B2 * | 10/2007 | Takeshita | 382/168 |
| 7,317,842 B2 * | 1/2008 | Lin et al. | 382/261 |
| 2002/0122120 A1 | 9/2002 | Hsieh | 348/231 |
| 2003/0222992 A1 | 12/2003 | Kaplinsky et al. | 348/223.1 |
| 2003/0223001 A1 | 12/2003 | Maeda et al. | 348/273 |
| 2004/0085458 A1 | 5/2004 | Yanof et al. | 348/223.1 |
| 2004/0212691 A1 | 10/2004 | Sato | 348/223.1 |
| 2005/0134702 A1 | 6/2005 | Subbotin | 348/223.1 |

* cited by examiner

*Primary Examiner*—Colin LaRose
(74) *Attorney, Agent, or Firm*—Perman & Green, LLP

(57) ABSTRACT

A method and an related apparatus for performing a white balance operation on an image with pixels, wherein global colour gain values common for substantially all pixels of the image are first determined. Then local colour gain values for individual pixels of the image are determined based on analyses of a local window comprising said individual pixel and a number of adjacent pixels. Thereafter, final colour gain values for individual pixels of the image are determined as a weighted average of the global and the local colour gain values, and a white balance operation is performed on the image using the final colour gain values.

29 Claims, 3 Drawing Sheets

AUTOMATIC WHITE BALANCING OF COLOUR GAIN VALUES

FIELD OF THE INVENTION

The present invention relates to image reconstruction, and more particularly to automatic white balancing of image colours.

BACKGROUND OF THE INVENTION

One of the challenging problems in colour image processing is adjusting the colour gains of the captured image in order to compensate for the variations in the imaging sensor's ability to reproduce the colours reliably when imaging is performed in the presence of a light source with certain spectral properties. These spectral properties also imply the colour temperature of the illuminating light source. Imaging sensors can have significant differences in their spectral response when exposed to different types of common sources of illumination. The sensor response is also typically non-linear and, therefore, depends on the amount of the incoming light and on several other ambient conditions. For these reasons, it is necessary to correct for this problem in imaging systems, and operations related to this are broadly referred to as white balancing. In order to compensate for changes in illumination spectra, the gains of the colour processing systems and/or imager should be adjusted. This adjustment is usually performed to correct for the overall luminance (brightness) of the image and to approach an acceptable reproduction of the perceived colours in the imaged scene. For this purpose, various methods of automatic white balancing (AWB) have been developed. In most camera systems, AWB is an integral part of the image reconstruction chain and is used to ensure that colours of an imaged scene will be reproduced correctly, even if the image has been recorded in varying lightning conditions, for example, in sunshine or in artificial lightning conditions. AWB defines the offset and gain values that will be associated with each colour component, red (R), green (G) and blue (B). The result defines the colour balance of the image.

When the spectra of the illumination source are unknown to the image reconstruction device, then the AWB adjustment is performed based on an analysis of the captured image itself. These AWB algorithms are typically based on histogram measures that will ultimately define a unique, global offset and gain value associated with each colour component. This approach is based on the premise that in complex images all colours are represented rather equally in all parts of the image. Thus, the gain values associated with all RGB colour components in the image can be defined as constants across the entire image area. In this approach, the auto white balance correction is made globally over the whole image.

If an imaged scene contains a large set of objects of varied and different colours or even large gray areas, the colours of the image will be reproduced substantially correctly. However, if the image contains any large substantially monochromatic region, e.g. a landscape with large portions of blue sky, or if the image is taken in uneven illuminating conditions, the conventional approach fails. Herein, uneven illumination refers to situations, wherein different parts of the image have been illuminated by light sources having different spectral and/or intensity properties.

In order to enhance the analysis of the differences in the illumination spectra of an image, US20030222992 proposes to divide the image into subframes and utilize only those parts of the image, which can be recognized clearly as non-monochromatic, for white balance correction calculations. Then the overall white-balance of the image can be shifted, if a change in the colour average is due to a change in the spectra of illumination, and not due to a presence of large monochromatic areas in the image.

However, a problem associated with the above arrangement is that the sub-frame division is only used to include or exclude certain parts of the image for global AWB correction analyses. Said method still determines a global AWB correction for the whole image after the sub-frame analysis has been performed. As a result, if an image includes areas with differences in relative illumination, these global AWB correction parameters applied for the whole image cannot compensate for these differences.

BRIEF DESCRIPTION OF THE INVENTION

Now it has been invented an improved method and an apparatus implementing the method for performing auto white balance correction for an image. As different aspects of the invention a method, an image processing device, a computer program and an image processing system are introduced, which are characterized in what is disclosed in the independent claims.

Some embodiments of the invention are disclosed in the dependent claims.

The invention is based on the idea of performing a white balance operation on an image such that, for the beginning, first gain values are determined globally for each colour component of the image. Then the operation of determining local gain values is started by first determining global colour gain values common for substantially all pixels of the image and then determining local colour gain values for individual pixels of the image based on analyses of a local window comprising said individual pixel and a number of adjacent pixels. Finally, the third, i.e. final gain values are determined for individual pixels of the image as a weighted average of the global and the local colour gain values, and the white balance operation is performed using the final colour gain values.

According to an embodiment, during the operation of determining local gain values, the image is first divided into a number of blocks each comprising several pixels and then said local window is determined such that it comprises a plurality of said blocks.

According to an embodiment, the white balance operation further comprises collecting local histogram values for each block; and determining block-specific gain values for colour components of the blocks.

According to an embodiment, the determination of said local gain values for individual pixels further comprises filtering the block-specific gain values; determining, for each pixel, distances from the pixel to the center point of the blocks comprised by said local window; and interpolating the filtered block-specific gain values with the distances from the center point of the corresponding blocks to said pixel.

According to an alternative embodiment, during the operation of determining local gain values said local window is determined such that it comprises a movable window around the pixel for which the second gain value is to be determined locally, the window comprising a plurality of pixels.

Then, the determination of said local gain values for individual pixels comprises collecting local histogram values for a first pixel from the pixels of the movable window situating in a first window position; storing said local histogram values for the first pixel in a first buffer; and determining said second gain values locally for said first pixel.

According to an embodiment, the determination of said local gain values for individual pixels further comprises moving said movable window to a second position corresponding to a second pixel for which the second gain value is to be determined locally; copying said local histogram values for the first pixel to a second buffer; updating the local histogram values in the second buffer such that the pixels of the first window position not belonging to the second window position are decremented from the local histogram values and the pixels of the second window position not belonging to the first window position are incremented to the local histogram values; and determining said second gain values locally for said second pixel.

According to an embodiment, the method can also be applied in determination of offset values for individual pixels of the image as a weighted average of local and global offset values.

The method and the arrangement of the invention provide the advantage that the smoothly varying gain values will reduce shading problems and correct for uneven lighting across the image area. Furthermore, by adjusting a single parameter, the weighted average between the global and local gain values can be tuned according to properties of an imaging device or usage conditions. The algorithm is especially useful when cameras are not equipped with flashlights, or when the use of these lights is not possible, e.g. in close range imaging. The algorithm can also be used to compensate for other optical shading problems. Moreover, the overhead computational and memory requirements are moderate.

BRIEF DESCRIPTION OF THE DRAWINGS

In the following the invention will be described in greater detail by means of preferred embodiments with reference to the attached drawings, in which.

DETAILED DESCRIPTION OF SOME EMBODIMENTS

Figure 1:
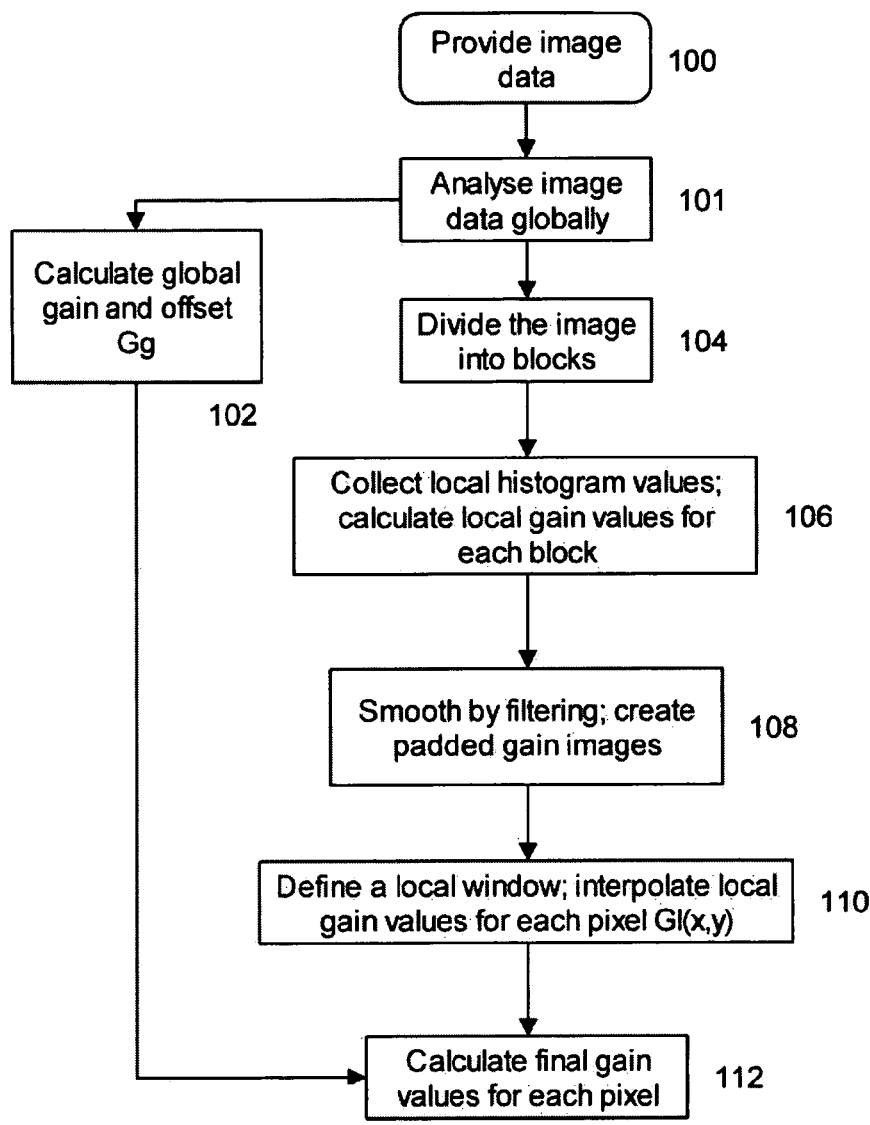
FIG. 1 is a flowchart illustrating an image processing method according to an embodiment of the invention.

FIG. 1 illustrates an image processing method according to an embodiment of the invention, which method can be carried out by a microprocessor or a microcontroller operating with an image sensor. AWB correction according to the invention may be introduced into the image at any time after the image has been captured using an image sensor. Therefore, the invention can be implemented into a camera device or also into any other device or system that processes digital images provided thereto.

The image processing method is started when an image is taken by an image sensor or otherwise provided to be processed (100). The image data is first globally analysed (101). This includes collecting histograms for each raw image F, said histograms corresponding to the analysed colour components (red, green blue): $Hist_R$, $Hist_G$, $Hist_B$. These histograms characterize the image's colour composition by counting the number of pixels in the image having the same characteristics.

Then, global gain and offset values are calculated (102) by using the above histograms, the global gain and the offset values corresponding to each colour component: $(G_R, Ofs_R)$, $(G_G, Ofs_G)$, $(G_B, Ofs_B)$. Accordingly, this step provides global parameters derived for the whole image data, which are needed in the later phases of the method as discussed further below.

In the next step (104), the image is divided into appropriate number of blocks $B_k$ of preferably, but not necessarily, equal size. The blocks preferably form a matrix of M×N rectangulars such that $k = \{1, \ldots, MN\}$ is an index running through all blocks of the image. For instance, for VGA images (resolution 640×480), an image can be divided into 64 blocks, i.e. 8×8 blocks, each consisting of 80×60 pixels. The number of blocks and their size in pixels can be adjusted according to the type of the image, the available processing power, the desired accuracy of the image reproduction, etc.

For each block $B_k$, $k = \{1, \ldots, MN\}$, local histogram values are collected (106), which local histogram values correspond the each colour component of a particular block: $Hist_R(B_k)$, $Hist_G(B_k)$, $Hist_B(B_k)$. These localized histograms are used in calculating local gains corresponding to each colour component: $G_R(B_k)$, $G_G(B_k)$, $G_B(B_k)$. The same method as is disclosed herein can be applied in determination of local offset values for each colour component, but for the sake of illustration of the embodiments, only the determination of colour gain values is disclosed more in detail.

For calculating said local gain values, several methods can be used. One method is a simple algebraic procedure, which equalizes the medians of the local histograms against the values of the median of the global histograms.

Then, optionally, the M×N gain "images" of the block gain values can be padded by replicating the values on the block borders. The padding provides the advantage that the block borders are properly smoothed in order to ensure a correct handling of the border areas. As a result, padded gain images $(I_R, I_G, I_B)$ of size $(M_1 \times N_1)$ are created and stored in a memory (108). Next, the padded gain "images" can optionally be smoothed using a smoothing filter, which can be, e.g. a simple 3×3 two-dimensional convolving filter with normalized values [1/12, 1/12, 1/12; 1/12, 1/3, 1/12; 1/12, 1/12, 1/12]. The filtering increases significantly the robustness of the system against sudden variations across the blocks and any possible errors that may happen in rare scene conditions. Additionally, the padding and the filtering do not cause any significant computational costs.

For each pixel (x, y) of the image F, a window of surrounding blocks is defined (110), whereby the surrounding blocks should correspond to the indices of the padded gain images $(I_R, I_G, I_B)$. Then distances $d_i$ from said pixel (x, y) to the center point of each surrounding block are determined. The local gain values are calculated by interpolating the values of $(I_R, I_G, I_B)$ in the window with their corresponding distances. As a result of the calculation, the local gain values $G_{RL}(x, y)$, $G_{GL}(x, y)$, $G_{BL}(x, y)$ for each pixel (x, y) are obtained.

In the last step (112), the final gain values at each pixel location (x,y) are calculated as a weighted average between the global and local gain values, which can be expressed in a generalized form:

$$G(x, y) = k * G_{global} + (1-k) * G_{local}(x, y), \; 0 \leq k \leq 1$$

To be more specific, for each colour component (R, G, B), the final gain values at each pixel location (x, y) are calculated accordingly:

$$G_R(x, y) = k * G_R + (1-k) * G_{RL}(x, y), \; 0 \leq k \leq 1$$

$$G_G(x, y) = k * G_G + (1-k) * G_{GL}(x, y), \; 0 \leq k \leq 1$$

$$G_B(x, y) = k * G_L + (1-k) * G_{BL}(x, y), \; 0 \leq k \leq 1$$

Thus, by adjusting the parameter k, the weighted average between the global and local gain values can be tuned according to properties of an imaging device, e.g. various mobile phones including a camera, or usage conditions. For example, for imaging devices not including a flash, it may be preferable to emphasize the local gain values more than in case of an imaging device including a flash. An example of usage conditions is close range imaging, whereby a flashlight cannot typically be used.

The output value of the AWB procedure, i.e. localized AWB correction parameters, is calculated as usual using the above localized gain values. It is obvious from the above formulas that the AWB procedure results in spatially varying gain values, which will reduce shading problems and correct for uneven lighting across the image area.

Figure 2A:
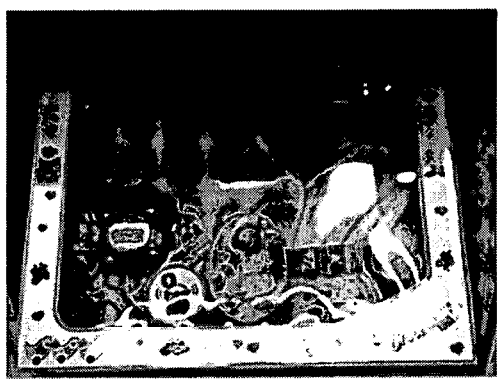
FIGS. 2a and 2b show an image reconstructed with a prior art method and according to the an embodiment of the invention, respectively.
Figure 2B:

The effects of the image processing method according to the embodiment can be illustrated by FIGS. 2a and 2b. FIG. 2a shows an image, which is reconstructed purely using the global, i.e. the conventional, AWB procedure. FIG. 2b shows the corresponding image, which is reconstructed with the spatial AWB procedure according to the invention. The improvement in image quality can be clearly seen by comparing these images. The details of the lower part of the image are seriously blurred in FIG. 2a, due to interfering light reflection, while in FIG. 2b, this light reflection has been corrected and the details can be clearly distinguished. The algorithm can also be used to compensate for other optical shading problems.

Figure 3:
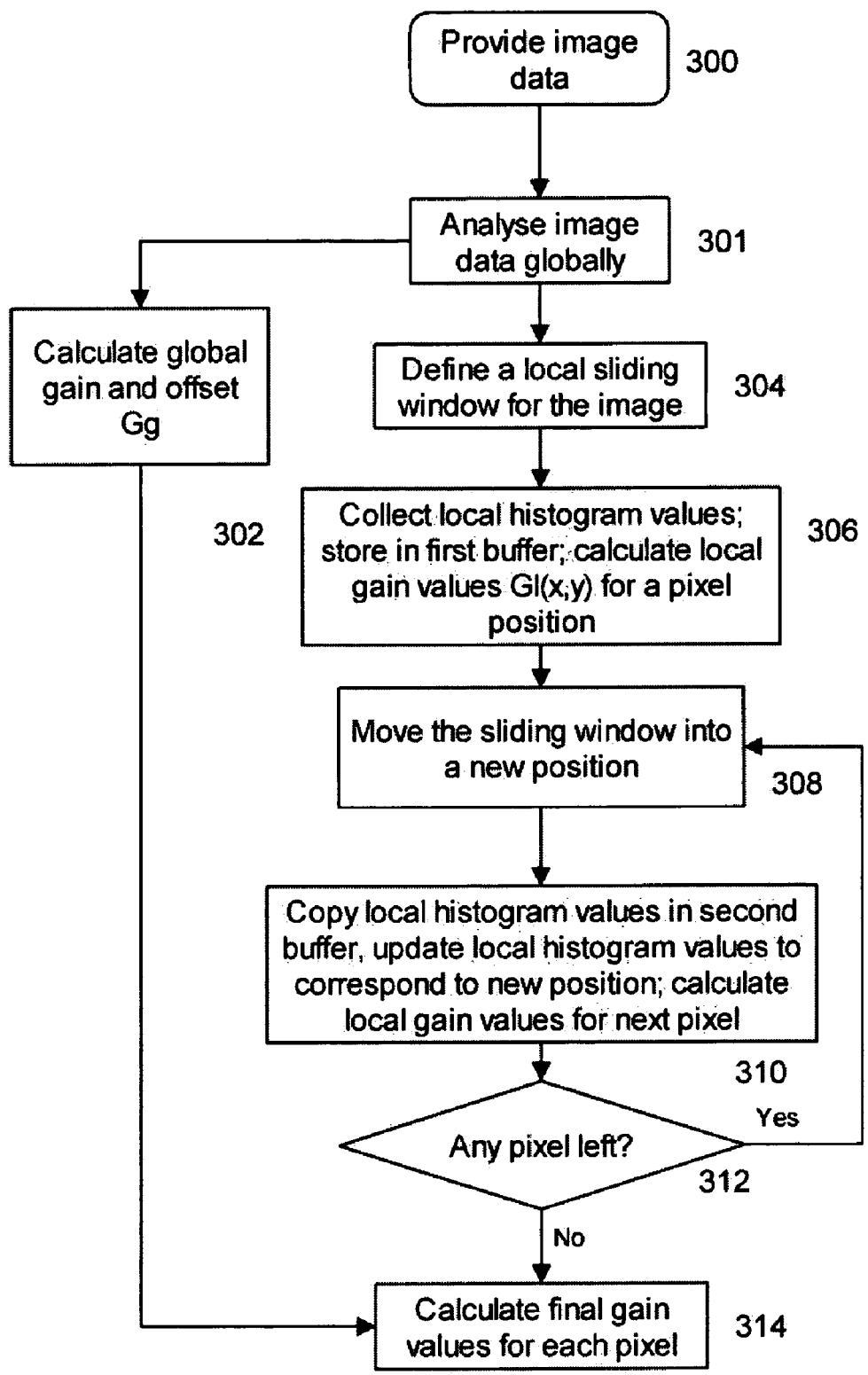
FIG. 3 is a flowchart illustrating an image processing method according to another embodiment of the invention.

It is notified that the embodiment of FIG. 1 is only one possible implementation for the inventive image processing method. The inventive idea of applying spatial AWB correction by using local gain values can be carried out in several ways. FIG. 3 illustrates another embodiment of the invention.

The method of FIG. 3 proposes another implementation for collecting the histogram statistics. Thus, when compared to FIG. 1, the steps of providing the digital image (step 300), collecting histograms for each globally analysed colour components (red, green blue): $Hist_R$, $Hist_G$, $Hist_B$. (step 301), and calculating the global gain and offset values (step 302) by using the histograms, are carried out as explained in FIG. 1.

Then, instead of dividing the image into number of blocks, (compare to the step 104 in FIG. 1), a method of sliding window is applied to collect the local histogram values. The window is preferably a rectangular-shaped matrix, the size of which is M×N pixels. Histogram values are collected for each window position such that local gain values can be calculated for a pixel situating in the center point of the window. Collecting local histogram values is started, for instance, in the upper left corner of the image, and sliding the window is performed in raster scan order. Naturally, any other starting point and scanning order can also be used. The implementation preferably comprises two buffer memories, wherein histogram values of the current window position and the next window position are stored.

Figure 4:
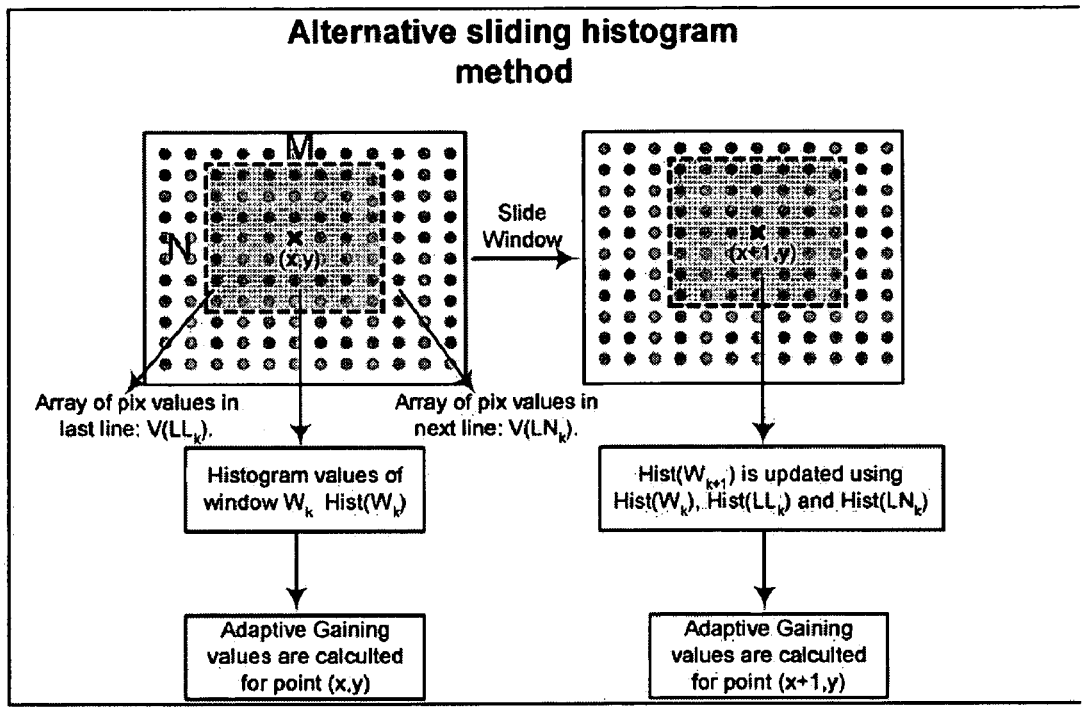
FIG. 4 illustrates the implementation of some details of the embodiment according to FIG. 3.

Generally, the principle of a sliding window can be illustrated by referring to FIG. 4. A sliding window $W_k$ is applied to an arbitrary position k of an image, the window covering M×N pixels such that the last (leftmost) vertical line comprises an array of N pixel values $VLL_k$. The histogram values Hist ($W_k$) are collected for the window position $W_k$ and stored in the first buffer memory. Then the local gain values $G_{RL}$ (x, y), $G_{GL}$ (x, y), $G_{BL}$ (x, y) are calculated for the pixel (x, y).

Then the window is slid right to the next position $W_{k+1}$. The histogram values Hist ($W_k$) are copied and stored to the second buffer memory as Hist ($W_{k+1}$)=Hist ($W_k$). Then the histogram values Hist ($W_{k+1}$) are updated to reflect the changed position such that for each i=1 to N (size of-the vertical line of the window) $VLL_k$(i) is decremented from Hist ($W_{k+1}$), and correspondingly, $VLN_k$(i) is incremented to Hist ($W_{k+1}$). In other words, the effect of the leftmost vertical line of window position $W_k$ is removed from the updated histogram values and the effect of the rightmost vertical line of window position $W_{k+1}$ is added to the updated histogram values Hist ($W_{k+1}$). Then the local gain values $G_{RL}$ (x+1, y), $G_{GL}$ (x+1, y), $G_{BL}$ (x+1, y) are calculated for the pixel (x+1, y).

Then the final gain values at each pixel location (x,y) are calculated as a weighted average between the global and local gain values in the same manner as is disclosed in FIG. 1 (step 112).

A further embodiment can be implemented as a combination of the two above-mentioned embodiments. Accordingly, the image is divided into blocks covering the whole image area, but for a given number of blocks the size of each block is defined bigger such that the blocks are partly overlapping, at least with one neighbouring block. In other words, pixels in the border areas of the blocks are common for at least two adjacent blocks. This increases the impact of local variations of the illumination spectra to the AWB calculations, thus resulting in better spatial image reconstruction.

As mentioned above, each of the above-described embodiment can also be similarly applied in determination of offset values for colour components, whereby the final offset values would be calculated as a weighted average of local offset values and global offset values of the image.

For each of the above-described embodiment, the overhead computational and memory requirements are moderate.

For users who are not fully aware of illumination issues or photographing principles, the proposed method enables taking images with improved quality. The method is particularly useful for applications, such as document imaging, wherein the imaging device is typically positioned between the light source (e.g. a pendant) and document to be imaged, thus causing some shading effect onto the document. In general, the method is useful in any application that will require post-processing operations, such as, segmentation, recognition, classification, etc.

Figure 5:
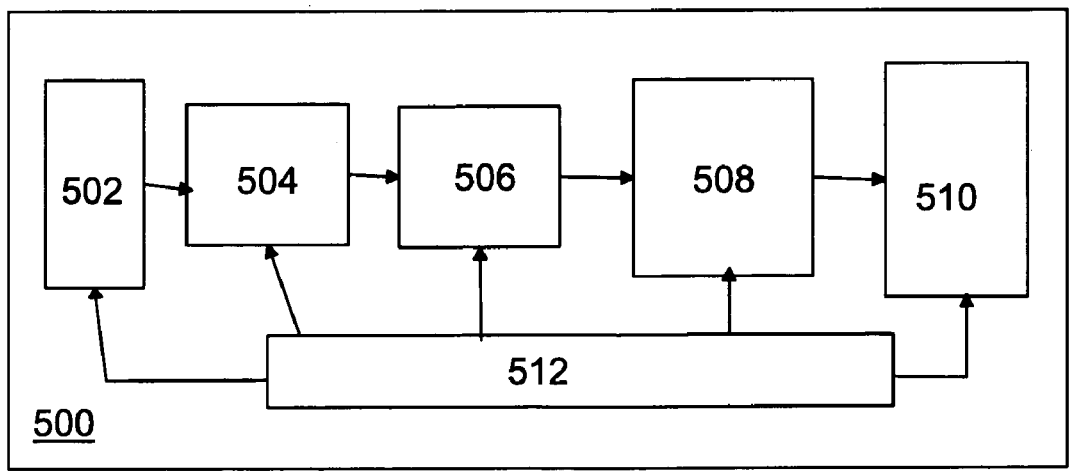
FIG. 5 shows a block chart of an imaging device according to the invention.

FIG. 5 illustrates an example of an imaging device 500 incorporating the features of the present invention. The imaging device 500 can include, for instance, a camera system, mobile phone, computer system or any other imaging-related electronic apparatus. The imaging device includes a lens system 502 for directing light from an object to be imaged to an image sensor 504. The image sensor may be e.g. a CMOS sensor or a charge coupled device (CCD), and it may be combined with a processor, such as a CPU, digital signal processor or microprocessor, to form an image-sensing unit 504 implemented as a single integrated circuit.

The imaging device further includes an analog-to-digital converter 506 for converting the image signals received at the image-sensing unit 504 into digital signals. The digital images signals are then processed in a processing unit 508, such as a CPU. The processing, including the AWB processing, is preferably performed as a computer program code executed in the processing unit 508. Alternatively, specific hardware components may be used for the processing, or a combination of hardware and software solutions may be used as well. Accordingly, the processing unit 508 may then comprise a specific circuit for performing the AWB process as described above. The imaging device may further include a conversion unit 510 for converting the image data into an appropriate file format for being outputted or displayed to the user, and a controller 512 for controlling the operations of the entire imaging apparatus 500.

As stated above, the above embodiments are preferably implemented by executing computer software code stored in the memory (MEM) in processing unit 508. Thus, the means for carrying out the image processing method described above are typically implemented as computer software code. The computer software may be stored into any memory means, such as the hard disk of a PC or a CD-ROM disc, from where it can be loaded into the memory of the imaging device. If the imaging device is comprises communication means, i.e. the imaging device is a mobile phone including a camera, the computer software can also be loaded through a network, for instance using a TCP/IP protocol stack.

Thus, a computer program for performing a white balance operation on an image according to the first aspect of the invention may preferably comprise a computer program code section for determining first gain values globally for each colour component of the image; a computer program code section for determining, for each pixel of the image, a local window comprising a number of adjacent pixels and a local histogram for said local window; a computer program code section for determining second gain values locally for each pixel of the image on the basis of said local histogram; a computer program code section for determining third gain values for each pixel of the image as a weighted average of the second gain values and the first gain values; and a computer program code section for performing a white balance operation using the third gain values.

It will be obvious to a person skilled in the art that, as the technology advances, the inventive concept can be implemented in various ways. The invention and its embodiments are not limited to the examples described above but may vary within the scope of the claims.

The invention claimed is:

1. A method for performing a white balance operation on an image with pixels, the method comprising:
    determining global colour gain values common for substantially all pixels of the image;
    determining local colour gain values for individual pixels of the image based on analyses of a local window comprising said individual pixel and a number of adjacent pixels;
    determining final colour gain values for individual pixels of the image as a weighted average of the global and the local colour gain values; and
    performing a white balance operation on the image using the final colour gain values.

2. The method according to claim 1, wherein said step of determining local colour gain values further comprises
    dividing the image into a number of blocks each comprising several pixels; and
    determining said local window such that it comprises a plurality of said blocks.

3. The method according to claim 2, further comprising
    for each block, collecting local histogram values; and
    determining block-specific colour gain values for colour components of the blocks.

4. The method according to claim 3, further comprising
    filtering the block-specific colour gain values;
    determining, for individual pixels, distances from the pixel to the center point of the blocks comprised by said local window; and
    interpolating the filtered block-specific colour gain values with the distances from the center point of the corresponding blocks to said pixel.

5. The method according to claim 2, wherein said step of determining local colour gain values further comprises dividing the image into a number of blocks of several pixels such that the blocks are partly overlapping with at least one neighbouring block.

6. The method according to claim 1, wherein said step of determining local colour gain values further comprises
    determining said local window such that it comprises a movable window around individual pixels for which the local colour gain value is to be determined, the window comprising a plurality of pixels.

7. The method according to claim 6, further comprising
    for a first pixel, collecting local histogram values from the pixels of the movable window situating in a first window position;
    storing said local histogram values for the first pixel in a first buffer; and
    determining said local colour gain values for said first pixel.

8. The method according to claim 7, further comprising
    moving said movable window to a second position corresponding to a second pixel for which the local colour gain value is to be determined;
    copying said local histogram values for the first pixel to a second buffer;
    updating the local histogram values in the second buffer such that the pixels of the first window position not belonging to the second window position are decremented from the local histogram values and the pixels of the second window position not belonging to the first window position are incremented to the local histogram values; and
    determining said local colour gain values for said second pixel.

9. The method according to claim 1, wherein
    the method is applied in determination of offset values for individual pixels of the image as a weighted average of local and global offset values.

10. An image processing device arranged to perform a white balance operation on an image with pixels, the device comprising:
    first determination means for determining global colour gain values common for substantially all pixels of the image;
    second determination means for determining local colour gain values for individual pixels of the image based on analyses of a local window comprising said individual pixel and a number of adjacent pixels;
    third determination means for determining final colour gain values for individual pixels of the image as a weighted average of the global and the local colour gain values; and
    processing means for performing a white balance operation using the final colour gain values.

11. The device according to claim 10, wherein said second determination means are arranged to
    divide the image into a number of blocks each comprising several pixels; and
    determine said local window such that it comprises a plurality of said blocks.

12. The device according to claim 11, wherein said second determination means are arranged to
    collect local histogram values for each block; and
    determine block-specific gain values for colour components of the blocks.

13. The device according to claim 12, wherein said second determination means are further arranged to
    filter the block-specific gain values;
    determine, for individual pixels, distances from the pixel to the center point of the blocks comprised by said local window; and interpolate the filtered block-specific gain values with the distances from the center point of the corresponding blocks to said pixel.

14. The device according to claim 11, wherein said second determination means are arranged to
divide the image into a number of blocks such that the blocks are partly overlapping with at least one neighbouring block.

15. The device according to claim 10, said second determination means are arranged to
determine said local window such that it comprises a movable window around the pixel for which the second gain value is to be determined locally, the window comprising a plurality of pixels.

16. The device according to claim 15, wherein said second determination means are arranged to
collect local histogram values for a first pixel from the pixels of the movable window situating in a first window position;
store said local histogram values for the first pixel in a first buffer; and
determine said local colour gain values for said first pixel.

17. The device according to claim 16, wherein said second determination means are further arranged to
move said movable window to a second position corresponding to a second pixel for which the second gain value is to be determined locally;
copy said local histogram values for the first pixel to a second buffer;
update the local histogram values in the second buffer such that the pixels of the first window position not belonging to the second window position are decremented from the local histogram values and the pixels of the second window position not belonging to the first window position are incremented to the local histogram values; and
determine said local colour gain values for said second pixel.

18. The device according to claim 10, the device being arranged to determine of offset values for individual pixels of the image as a weighted average of local and global offset values.

19. A computer program, stored on a computer-readable medium, for performing a white balance operation on an image with pixels, the computer program comprising:
a computer program code section for determining global colour gain values common for substantially all pixels of the image;
a computer program code section for determining local colour gain values for individual pixels of the image based on analyses of a local window comprising said individual pixel and a number of adjacent pixels;
a computer program code section for determining final colour gain values for individual pixels of the image as a weighted average of the global and the local colour gain values; and
a computer program code section for performing a white balance operation on the image using the final colour gain values.

20. The computer program according to claim 19, further comprising
a computer program code section for dividing the image into a number of blocks each comprising several pixels; and
a computer program code section for determining said local window such that it comprises a plurality of said blocks.

21. The computer program according to claim 20, further comprising
a computer program code section for collecting local histogram values for each block; and
a computer program code section for determining block-specific gain values for colour components of the blocks.

22. The computer program according to claim 21, further comprising
a computer program code section for filtering the block-specific gain values;
a computer program code section for determining, for each pixel, distances from the pixel to the center point of the blocks comprised by said local window; and
a computer program code section for interpolating the filtered block-specific gain values with the distances from the center point of the corresponding blocks to said pixel.

23. The computer program according to claim 20, further comprising
a computer program code section for dividing the image into a number of blocks such that the blocks are partly overlapping with at least one neighbouring block.

24. The computer program according to claim 19, further comprising
a computer program code section for determining said local window such that it comprises a movable window around the pixel for which the second gain value is to be determined locally, the window comprising a plurality of pixels.

25. The computer program according to claim 24, further comprising
a computer program code section for collecting, for a first pixel, local histogram values from the pixels of the movable window situating in a first window position;
a computer program code section for storing said local histogram values for the first pixel in a first buffer; and
a computer program code section for determining said local colour gain values for said first pixel.

26. The computer program according to claim 25, further comprising
a computer program code section for moving said movable window to a second position corresponding to a second pixel for which the local colour gain value is to be determined;
a computer program code section for copying said local histogram values for the first pixel to a second buffer;
a computer program code section for updating the local histogram values in the second buffer such that the pixels of the first window position not belonging to the second window position are decremented from the local histogram values and the pixels of the second window position not belonging to the first window position are incremented to the local histogram values; and
a computer program code section for determining said local colour gain values for said second pixel.

27. The computer program according to claim 19, wherein said computer program is arranged to determine of offset values for individual pixels of the image as a weighted average of local and global offset values.

28. The computer program according to claim 19, wherein said computer program is executable in an image processing device.

29. An image processing system arranged to perform a white balance operation on an image with pixels, the system comprising:

first determination means for determining global colour gain values common for substantially all pixels of the image;

second determination means for determining local colour gain values for individual pixels of the image based on analyses of a local window comprising said individual pixel and a number of adjacent pixels;

third determination means for determining final colour gain values for individual pixels of the image as a weighted average of the global and the local colour gain values; and processing means for performing a white balance operation using the final colour gain values.

* * * * *